United States Patent [19]
Matsumoto et al.

[11] Patent Number: 5,285,520
[45] Date of Patent: Feb. 8, 1994

[54] PREDICTIVE CODING APPARATUS

[75] Inventors: Shuichi Matsumoto, Fujimi; Masahiro Saito, Higashiyamoto, both of Japan

[73] Assignee: Kokusai Denshin Denwa Kabushiki Kaisha, Tokyo, Japan

[21] Appl. No.: 715,918

[22] Filed: Jun. 14, 1991

Related U.S. Application Data

[63] Continuation-in-part of Ser. No. 312,032, Feb. 17, 1989, abandoned.

[30] Foreign Application Priority Data

Mar. 2, 1988 [JP] Japan .................................. 63-47620

[51] Int. Cl.⁵ .............................................. G10L 9/00
[52] U.S. Cl. ......................................................... 395/2
[58] Field of Search ................................... 381/29–40; 395/2; 358/133

[56] References Cited

U.S. PATENT DOCUMENTS 4,472,832  9/1984  Atal et al. ............................... 395/2

Primary Examiner—Allen R. MacDonald
Assistant Examiner—Michelle Doerrler
Attorney, Agent, or Firm—Emmanuel J. Lobato; Robert E. Burns

[57] ABSTRACT

A coding apparatus is disclosed, in which coding can be achieved by simply storing, in a memory, the results of necessary coding operations including the feedback of the quantization error and reading out the data from an address of the memory specified by input data. Consequently, an encoded code can be obtained at a far higher speed than in a case where operations are performed by individual operation circuits for coding and decoding.

3 Claims, 3 Drawing Sheets

5,285,520

PREDICTIVE CODING APPARATUS

CROSS-REFERENCE TO RELATED APPLICATION

The present application is a continuation-in-part of an application of Ser. No. 07/312,032 filed on Feb. 17, 1989 and now abandoned.

BACKGROUND OF THE INVENTION

The present invention relates to a coding apparatus and, more particularly, to a predictive coding apparatus for use in a system which transmits so-called predictive encoded codes.

A variety of coding system have been proposed for reducing the amount of data in case of digital transmission of information such as an image or voice signal. One of such systems is a differential pulse code modulation (hereinafter referred to as DPCM) system which compresses information content through utilization of the correlation between vicinal sample values. As is well-known in the art, according to the DPCM system, a sample value is once decoded, the decoded value is used to obtain a predictive value of the sample value to be encoded next so that an error between the predictive value and the actual sample value is quantized and encoded.

In general, the difference value between the previous predictive value and the current sample value is small, and transmission of such a difference value in a coded form permits compressed transmission of information.

In case of handling samples obtained by the use of a high sampling frequency, such as an HDTV (high fidelity Television) signal, parallel operations including complicated processing are necessary to raise the coding speed therefor. However, a high-speed coding apparatus having a high degree of versatility has not yet been proposed by this time.

SUMMARY OF THE INVENTION

An object of the present invention is to provide a predictive coding apparatus which permits high-speed coding, inclusive of processing for feeding a quantized error back to the input side for correcting a code input value, and has a high degree of versatility.

To attain the above object, the coding apparatus of the present invention is provided with input terminal means for receiving a sample value for each sampling time slot; a memory in which the sample value and its predictive value are input as a set of address while data indicative of an encoded code of the sample value, a local decoded value of the encoded code and a quantization error of the encoded code are pre-stored and from which the data are read out in response to the input; feedback means for feeding back the local decoded value from an output of the memory back to the input side thereof as the quantization errors at a just succeeding sampling time slot; and means for correcting the sample value on the basis of the data indicative of the quantization error at the just succeeding sampling time slot.

With such an arrangement, coding can be achieved by simply storing, in a memory, the results of necessary coding operations including the feedback of the quantization error and reading out the data from an address of the memory specified by input data. Consequently, an encoded code can be obtained at a far higher speed than in a case where operations are performed by individual operation circuits for coding and decoding.

Moreover, the algorithm can be changed through very simple work such as the substitution of the memory with another.

BRIEF DESCRIPTION OF THE DRAWINGS

The present invention will be described in detail below in comparison with prior art with reference to the accompanying drawings, in which.

DETAILED DESCRIPTION

To make better understanding the present invention, unknown examples of DPCM coding apparatus formed by the applicants without introducing the present invention, will first be described.

Figure 3:
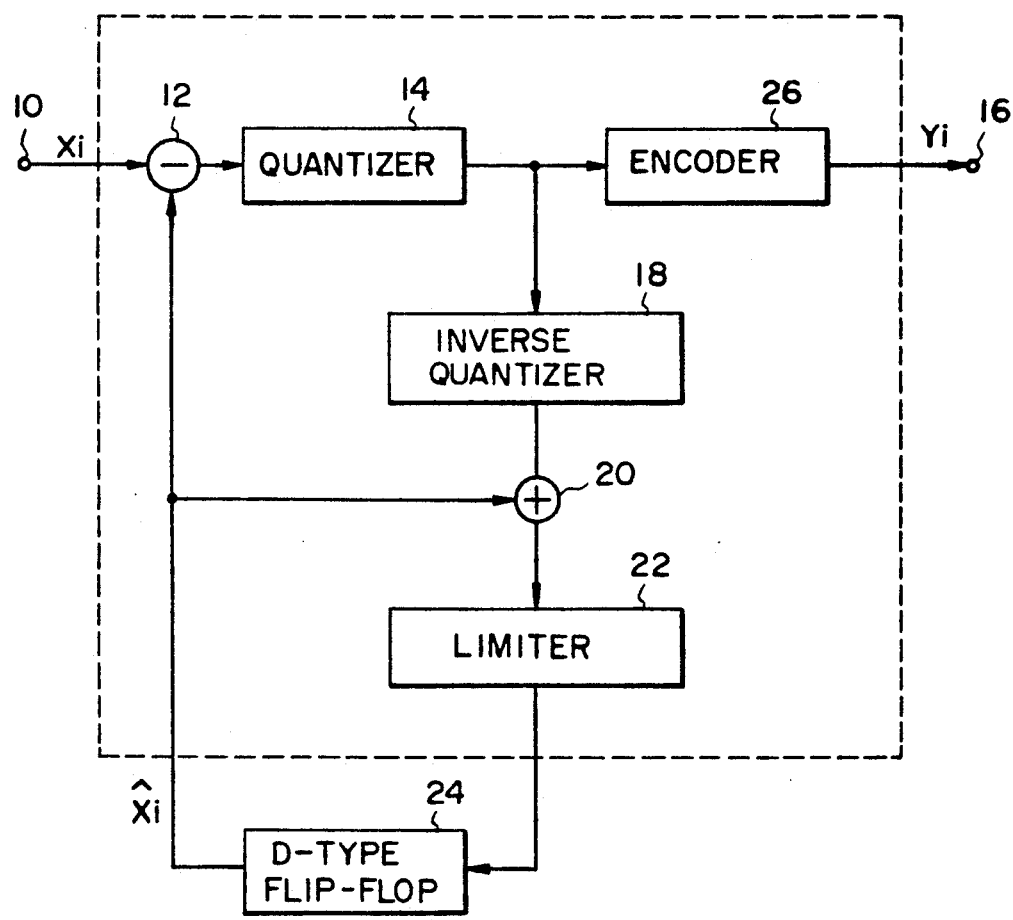
FIG. 3 is a block diagram showing a simple example of a DPCM coding apparatus formed by the applicants in comparison with the present invention.

FIG. 3 is a diagram showing an example of the arrangement of a DPCM coding apparatus which employs the simplest previous-value-prediction technique. A sample value $X_i$ input to a input terminal 10 is applied to a subtractor 12, in which a predictive value described later (a decoded value of a previous-value, in this example) is subtracted from the input sample value. A quantizer 14 quantizes the output difference value from the subtractor 12, and a binary encoder 26 encodes the quantized output into a DPCM code $Y_i$, which is provided to an output terminal 16. The output of the quantizer 14 is also applied to an inverse quantizer 18. The inverse quantizer 18 decodes the output of the quantizer 14 into a difference value, which is applied to an adder 20. The adder 20 adds the difference value to the previous predictive value supplied to the subtractor 12, thereby restoring the difference value to the sample value. A limiter 22 limits the amplitude of the output of the adder 20 to a predetermined range and supplied it to a D-type flip-flop 24. The output $\tilde{X}_i$ of the D-type flip-flop 24 is used as a predictive value of the next sample value and is applied to the subtractor 12 and the adder 20.

Figure 4:
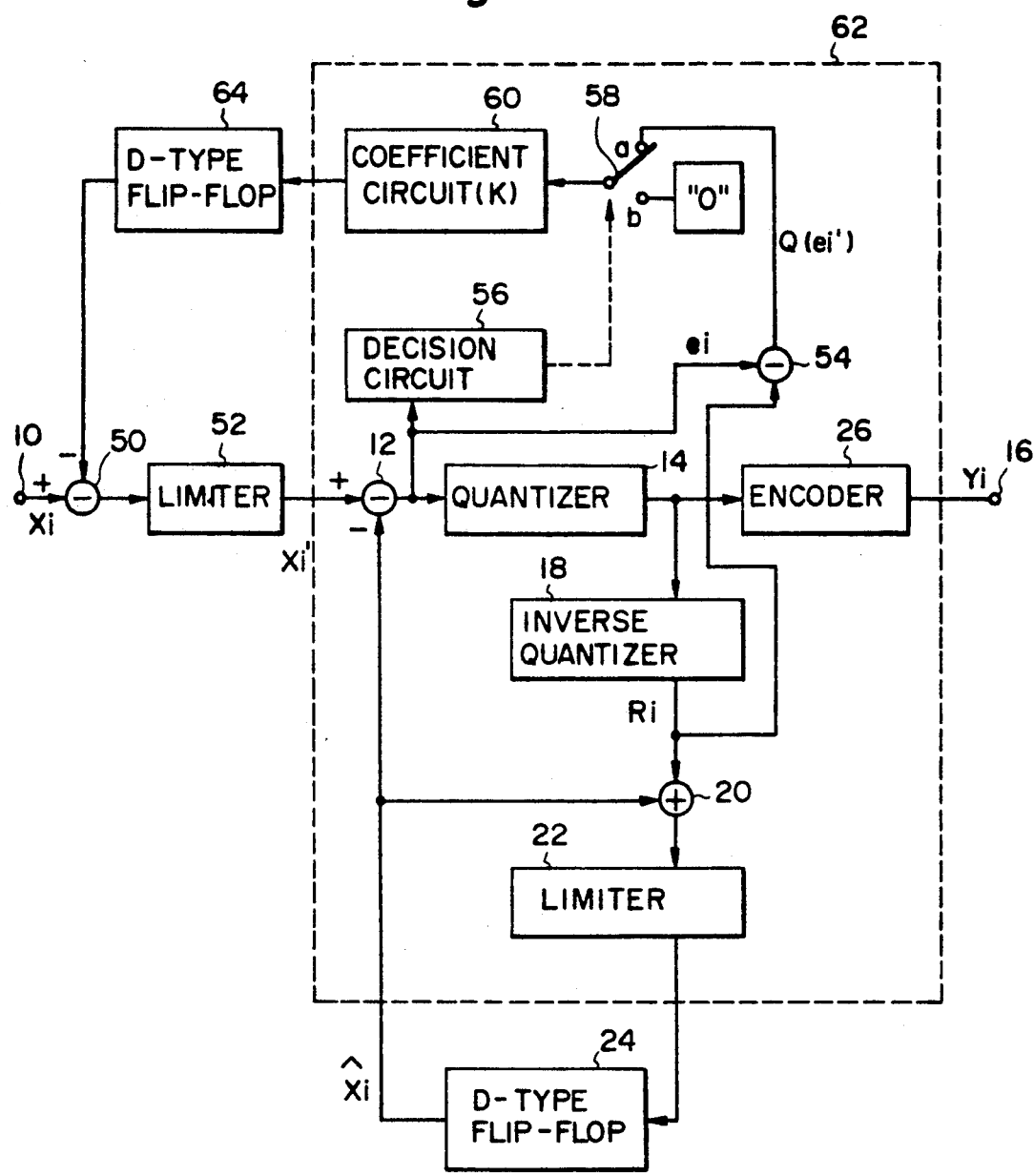
FIG. 4 is a block diagram showing another example of a coding apparatus which is proposed by the applicants to perform further processing of feeding back a quantization error in comparison with the present invention.

FIG. 4 is a diagram showing the arrangement of a coding apparatus which additionally employs, in the coding apparatus of FIG. 3, a filter (hereinafter referred to as a noise shaping filter) for multiplying the quantized error by a coefficient k (where k < 1) and feeding it back to the input side. In FIG. 4 the same circuit elements as those in FIG. 3 are identified by the same reference numerals and no description will be given thereof.

In FIG. 4 the sample value $X_i$ input to the input terminal 10 is applied to a subtractor 50, wherein a difference output is detected between the input sample value and a quantized error feedback value from a D-type flip-flop 64. A limiter 52 is to limit data to a maximum (or minimum) value in a case where the data overflows (or underflows) in the subtractor 50. The data provided through the limiter 52 is a corrected sample value $X_i'$.

The corrected sample value $X_i'$ is applied to the subtractor 12, from which a difference is detected between it and the predictive value $\hat{X}_i$, so that the detected difference is supplied to the quantizer 14, a decision circuit 56 and a subtractor 54. The subtractor 54 obtains a difference between the prediction error (the difference value) $e_i$ and a quantized prediction error $R_i$, and the obtained difference is supplied to a terminal a of a switch 58. The switch 58 selectively outputs a quantized error $Q(e_i')$ or "0" in accordance with the decision by the decision circuit 56. On the basis of the prediction error $e_i$, for example, when $|e_i| < Th$ (where Th is a threshold value), the decision circuit 56 controls the switch 58 so that the input to the terminal a is supplied to a coefficient circuit 60. The output of the switch 58 is multiplied by the coefficient k in the coefficient circuit 60 and then applied to the D-type flip-flop 64, wherein it is used to correct the next sample value $X_{i+1}$.

In case of handling samples obtained by the use of a high sampling frequency such as an HDTV (High Fidelty Television) signal, however, even if a high-speed logic IC is employed, the operation of the DPCM loop (until a locally decoded value is obtained which is the input to the D-type flip-flop 24) cannot be completed within one sampling period, and consequently, the operation inevitably falls back on parallel processing. For instance, if the sampling frequency is 48.6 MHz, then the sampling period will be 20.5 ns. On the other hand, the time necessary for the operation of the DPCM loop is about 165 ns even if a high-speed TTL-IC is used as the logic IC and a high-speed programable ROM as the quantizer 14. Since $165/20.5 = 8.05$, the number of channels for parallel processing is nine; namely, nine circuits of exactly the same structure are required. More channels will be needed for complicated processing which involves the feedback of the quantized error to the input side for correcting the coded input value as described above with regard to FIG. 4. The use of parallel processing will also require, in the above-mentioned example, a circuit for splitting a signal into nine phase positions and a circuit for multiplexing the nine signals individually processed. This inevitably introduces complexity in the structure of hardware and appreciably enlarges its scale.

Furthermore, according to the arrangement shown in FIG. 3, in case of a change of the algorithm used such as the substitution of the quantizer by a code decision type quantizer (a quantizer which assigns two difference values to one code word and uses, as a true difference value, that one of the two difference value whose decoded value falls within a normal range) for suppressing the locally decoded value within a predetermined range and efficiently utilizing the dynamic range of the input sample value, the hardware used must be modified thoroughly and such a modification is very difficult.

With reference to the accompanying drawings of FIGS. 1 and 2, an embodiment of the present invention will hereinafter be described to eliminate the above defects of construction shown in FIGS. 3 and 4.

Figure 1:
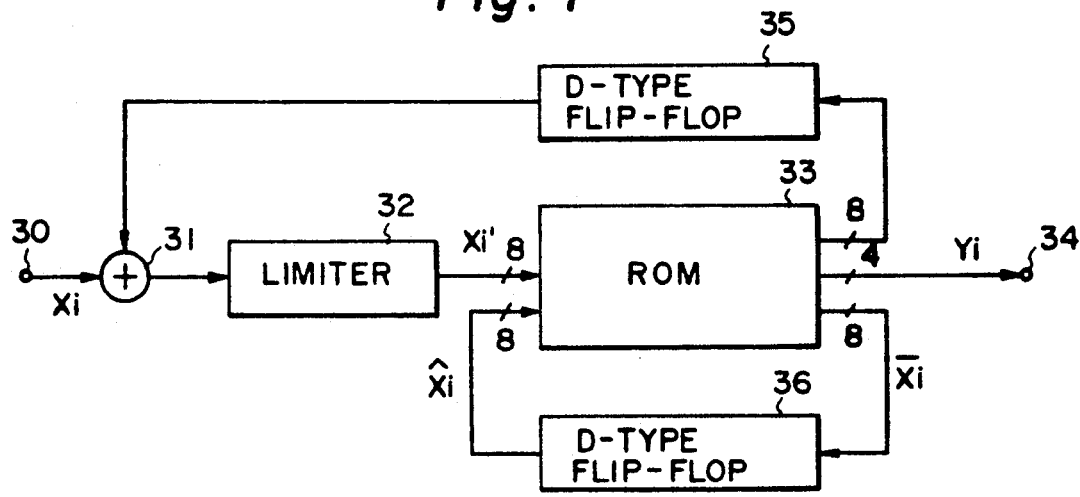
FIG. 1 is a block diagram illustrating an embodiment of the coding apparatus of the present invention.

FIG. 1 is a diagram illustrating the arrangement of the principal part of an embodiment of the coding apparatus according to the present invention. In FIG. 1, reference numeral 30 indicates an input terminal for the sample value $X_i$ of n (eight in this example) bits, 31 an adder for correcting the input sample value $X_i$ by a quantization error feedback value, 32 a limiter for preventing an overflow or underflow of the operation by the adder 31, 33 a ROM, 34 an output terminal for an encoded code $Y_i$ of m (four in this example) bits, 35 a D-type flip-flop for feeding the quantization error feedback value to the adder 31 for correcting the next input sample value, and 36 a D-type flip-flop for feeding a local decoded value as the next predictive value back to the input of the ROM 33.

The input sample value $X_i$ from the input terminal 30 is applied to the adder 31, in which it is added to the quantization error feedback value from the D-type flip-flop 35, and the added output is applied to the limiter 32. The limiter 32 detects an overflow or underflow of the operation in the adder 31 on the basis of the signs of its carry output and the quantization error feedback value to clip the corrected value to a predetermined maximum value (255, for example) in the case of the overflow and a predetermined minimum value (0, for instance) in the case of the underflow. The corrected input sample value $X_i'$ and an 8-bit predictive value $\hat{X}_i$ from the D-type flip-flop 36 are supplied to an address input of the ROM 33. In other words, the 8-bit input sample value $X_i$ and the 8-bit predictive value $\hat{X}_i$ constitute a 16-bit address signal of the ROM 33.

The ROM 33 has a table size of $256 \times 256 \times 1$ datalength, by way of example and responds to the address signal made up of the input sample value $X_i$ and the predictive value $\hat{X}_i$ to provide a DPCM code $Y_i$ to the output terminal 34, a local decoded value $X_i$ to the D-type flip-flop 36 and the quantization error feedback value to the D-type flip-flop 35. That is to say, the ROM 33 in the embodiment of FIG. 1 performs the function of the broken-lined part indicated by 62 in FIG. 4. The time for outputting the above data corresponds to one readout cycle time of the ROM 33, and hence is very short. The number of channels for parallel processing can be therefore made smaller than in case of a similar circuit formed using logic IC's according to the prior art.

Further, since the broken-lined part 62 is replaced by the ROM 33, the number of IC's used in each parallel processing section can also be reduced. This affords substantial reduction of the number of IC needed in the entire apparatus, leading to an appreciable decrease in the amount of hardware used.

According to this embodiment, even if how complicated the algorithms used may be, coding operations of preknown input-output characteristics can be achieved using the same circuit arrangement, by simply replacing (or switching) the ROM by another, as long as the numbers of input and output bits are equal. For example, in the processing depicted in FIG. 4, it is possible to selectively employ an algorithm which involves adaptive processing of changing the coefficient k of the coefficient circuit 60 in accordance with the prediction error $e_i$, instead of using the decision circuit 56 and the switch 58. Even if the number of input or output bits changes, it is necessary only to prepare a ROM corresponding thereto and change the design of the apparatus according to the bit duration of the signal path. That is, the coding apparatus of this embodiment allows much ease in changing the algorithm used and is highly versatile.

Figure 2:
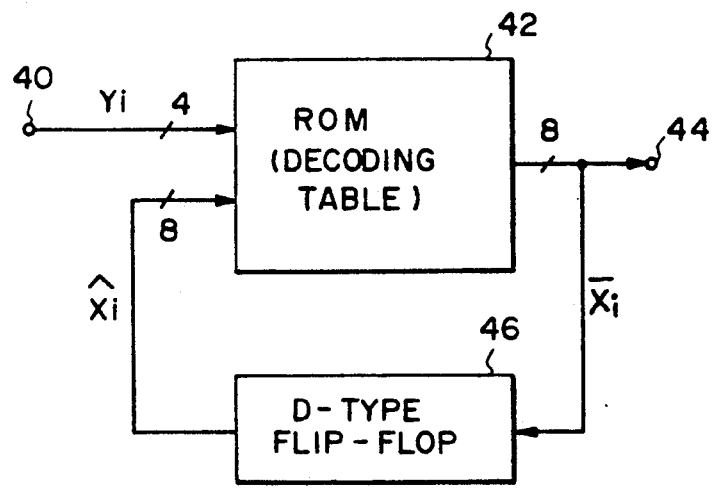
FIG. 2 is a block diagram showing a decoding apparatus for use in combination with the coding apparatus of FIG. 1.

FIG. 2 is a diagram illustrating the general arrangement of an example of a decoding apparatus for use in combination with the coding apparatus shown in FIG. 1. In FIG. 2, reference numeral 40 indicates a terminal for receiving the DPCM code $Y_i$ transmitted from the coding apparatus and 42 a ROM which constitutes a decoding table and is supplied at its address input with the DPCM code $Y_i$ and the predictive value $\hat{X}_i$ described later.

A decoded value output X of an output 44 obtained from the ROM 42 is also applied to a D-type flip-flop 46. The output of the D-type flip-flop 46 is provided as the predictive value $\hat{X}_i$ to the ROM 42.

In this instance, since the cycle time of the ROM 42 is also around 35 ns, the number of channels for parallel processing is greatly decreased and the amount of hardware used can be reduced.

The contents of the decoding table constituted by the ROM 42 is determined in correspondence to the contents of the ROM 33 of the transmitting side to obtain the decoded value.

While the above embodiment has been described in connection with the previous-value prediction DPCM, the present invention is not limited specifically thereto and is also applicable not only to DPCM coding apparatus which perform predictions such as a two-dimensional prediction, a three-dimensional prediction and an adaptive prediction but also to a coding apparatus of arbitrary code lengths.

As described above, the present invention offers a coding apparatus capable of high-speed coding and, at the same time, keeps the hardware of the entire apparatus small-scale. Moreover, the coding apparatus of the present invention permits relatively easy change of the algorithm for coding operation, and hence can be used for many purposes without the need of modifying the circuit arrangement, thus providing a system of extremely high versatility.

What we claim is:

1. A coding apparatus comprising:
    input terminal means for receiving a sample value signal (xi) for each sampling time slot;
    correction means for correcting, for each sampling time slot, the sample value signal by the use of a quantization error signal at a sampling time slot just succeeding to an instant sampling time slot to produce a corrected sample value signal (xi');
    a memory having address signal input terminals to receive, for each sampling time slot, the corrected sample value signal (xi') and the corrected predictive value signal ($\hat{x}i$) as a set of address signals, for storing, for each set of said address signals, data indicative of an encoded code signal (yi) of the sample value signal (xi), a local decoded value signal ($\bar{x}i$) of the encoded code signal and the quantization error signal of the encoded code signal, and having output terminals for sending out, for each sampling time slot, the local decoded value signal and the quantization error signal, read out in response to each set of said address signals;
    feedback means for feeding back the local decoded value signal ($\bar{x}i$) from one of said output terminals of the memory to one of the address signal input terminals thereof as the predictive value signal ($\hat{x}i$) at a sampling time slot just succeeding to an input sampling time slot; and
    means for applying the quantization error signal from one of the output terminals of the memory to said correction means at the sampling time slot just succeeding to the instant sampling time slot.

2. A coding apparatus according to claim 1, in which the memory is a read-only memory.

3. A coding apparatus according to claim 1 or 2, further comprising limiter means connected between said correction means and the other of the address signal input terminals of the memory for limiting the corrected sample value signal to include a limited range.

* * * * *